US008428565B2

(12) United States Patent
Middleton et al.

(10) Patent No.: US 8,428,565 B2
(45) Date of Patent: Apr. 23, 2013

(54) MANAGING WEB SERVICES DATA AND PRESENCE DATA

(75) Inventors: Justin Middleton, San Francisco, CA (US); Alex Ranous, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 12/069,970

(22) Filed: Feb. 13, 2008

(65) Prior Publication Data

US 2008/0172458 A1   Jul. 17, 2008

Related U.S. Application Data

(63) Continuation of application No. 11/653,661, filed on Jan. 12, 2007, now Pat. No. 7,693,953.

(51) Int. Cl.
*H04M 3/42* (2006.01)

(52) U.S. Cl.
USPC ............... 455/414.1; 455/414.2; 455/414.3; 709/203

(58) Field of Classification Search ............... 709/203, 709/226; 701/207, 208; 455/414.1, 414.2, 455/414.3
See application file for complete search history.

(56) References Cited

U.S. PATENT DOCUMENTS

| 6,012,100 | A | 1/2000 | Frailong et al. |
| 6,716,101 | B1 * | 4/2004 | Meadows et al. ......... 455/456.1 |
| 7,359,894 | B1 * | 4/2008 | Liebman et al. ............... 1/1 |
| 7,693,953 | B2 | 4/2010 | Middleton |
| 7,739,139 | B2 * | 6/2010 | Robertson et al. .......... 705/7.12 |
| 7,801,971 | B1 * | 9/2010 | Amidon et al. ............. 709/217 |
| 8,108,501 | B2 * | 1/2012 | Birnie et al. ................ 709/223 |
| 2002/0133569 | A1 | 9/2002 | Huang et al. |
| 2005/0091309 | A1 | 4/2005 | Bookman et al. |
| 2005/0267949 | A1 * | 12/2005 | Scott, III ........................ 709/219 |
| 2006/0085419 | A1 * | 4/2006 | Rosen .............................. 707/9 |
| 2006/0161599 | A1 * | 7/2006 | Rosen .......................... 707/201 |
| 2006/0209868 | A1 | 9/2006 | Callaghan |

(Continued)

FOREIGN PATENT DOCUMENTS

| RU | 2297101 | 4/2007 |
| RU | 2454007 | 6/2012 |

OTHER PUBLICATIONS

Julio Ojeda-Zapata, "You are here", Jun. 1, 2003, Pioneer Press, TwinCities.com.*
"Notice of Allowance", U.S. Appl. No. 11/653,661, (Jan. 21, 2010),13 pages.

(Continued)

*Primary Examiner* — Kamran Afshar
*Assistant Examiner* — Mong-Thuy Tran
(74) *Attorney, Agent, or Firm* — Wolfe-SBMC

(57) ABSTRACT

Interfacing a wireless device with web services is described, including social networking web services. For example, a system for interfacing a wireless device with a plurality of web services comprises a web service proxy having an API to allow other modules to interface with the web service proxy; a plurality of web services adapters interfaced with the web services proxy through the API, each one of the web services adapters to communicate with a particular web service using the specific communication formats for the web service; where the web services adapters and the web services proxy convert between the communication formats employed to communicate with each of the web services and a wireless communication format, the wireless communication format being a different format than the communication formats for each of the web services, thereby enabling bi-directional communication between the wireless device and the plurality of web services.

15 Claims, 8 Drawing Sheets

U.S. PATENT DOCUMENTS

| | | | | |
|---|---|---|---|---|
| 2006/0229902 | A1* | 10/2006 | McGovern et al. | 705/1 |
| 2007/0003038 | A1* | 1/2007 | Siegel et al. | 379/201.01 |
| 2007/0032240 | A1* | 2/2007 | Finnegan et al. | 455/445 |
| 2007/0032945 | A1* | 2/2007 | Kaufman | 701/208 |
| 2007/0112766 | A1* | 5/2007 | Hu et al. | 707/6 |
| 2007/0130153 | A1* | 6/2007 | Nachman et al. | 707/10 |
| 2007/0218900 | A1* | 9/2007 | Abhyanker | 455/435.1 |
| 2007/0273558 | A1* | 11/2007 | Smith et al. | 340/995.1 |
| 2007/0282621 | A1* | 12/2007 | Altman et al. | 705/1 |
| 2008/0056215 | A1* | 3/2008 | Kopikare et al. | 370/338 |
| 2008/0102856 | A1* | 5/2008 | Fortescue et al. | 455/456.1 |
| 2008/0104227 | A1* | 5/2008 | Birnie et al. | 709/224 |
| 2008/0133649 | A1* | 6/2008 | Pennington et al. | 709/203 |
| 2008/0168033 | A1* | 7/2008 | Ott et al. | 707/3 |
| 2010/0153832 | A1* | 6/2010 | Markus et al. | 715/205 |

OTHER PUBLICATIONS

"Non Final Office action", U.S. Appl. No. 11/653,661, (May 29, 2009),22 pages.

"Foreign Office Action", Russian Application No. 2009130737, (Sep. 13, 2011), 13 pages.

"Supplementary European Search Report", EP Application No. 08705534.9, (Nov. 17, 2011), 6 pages.

"Written Opinion", Application No. PCT/US2008/000334, (Jun. 26, 2008), 6 pages.

"Decision on Grant", Russian Application No. 2009130737, (Dec. 26, 2011),16 pages.

* cited by examiner

MANAGING WEB SERVICES DATA AND PRESENCE DATA

CLAIM OF PRIORITY

This Application is a Continuation of application "System and Method For Managing Web Services Data and Presence Data Related To A Plurality Of Users" filed by Justin Middleton, et al., on Jan. 12, 2007 (U.S. patent application Ser. No. 11/653,661 now U.S. Pat. No. 7,693,953).

TECHNICAL FIELD

This application relates generally to the field of data processing systems and more particularly to managing web services data and presence data.

BACKGROUND

Many people access Internet content and Web Services from a wireless communication device (e.g., a cellular telephone or PDA) so that they are not restricted to a personal computer with an Internet connection. Most wireless communication devices retrieve Internet content and Web Services in one of two different ways: use of a Web browser or use of a Wireless Access Protocol (WAP) application.

High power wireless communication devices often include a Web browser (e.g., Windows® Explorer) so that information can be retrieved from an Internet site on the device just as if the user was at a personal computer. One problem with the use of Web browsers on wireless devices, though, is that the devices require a lot of processing power and bandwidth to handle and convert the large amount of data exchanged so as to be compatible with the Internet site and the wireless device.

In order to overcome processing and network bandwidth restraints posed by a Web browser, many wireless communication devices retrieve Internet content and Web Services using an application that follows the Wireless Application Protocol (WAP). WAP applications allow devices to connect to a Web server, but require less processing power and use less network bandwidth than a typical Web browser. For example, the social networking site MySpace® currently provides a Web Services proxy that can be connected to through the use of a WAP application in order for a user of a wireless communication device to connect to MySpace®.

A Web Services proxy may be updated to add new features for Web applications and/or to fix problems. One problem, though, with current WAP applications is that they become useless if the associated Web Services proxy is updated. That is, the WAP application is hard coded so as to be compatible with the previous version of the Web Services proxy. Hence, when the Web Service proxy is updated the WAP application may be unable to connect to the new version of the Web Services proxy. As a result, the WAP application on a device must typically be updated when a Web Services proxy is updated.

Updating every WAP application (e.g., updating every cellular telephone of a Cellular Telephone Service Provider) can be very costly and consume large portions of network bandwidth. In addition, device applications implemented through WAP applications can require multiple requests from the device to the Web Services proxy, tying up valuable bandwidth. Furthermore, the communication protocol employed to allow a WAP application and a Web Services proxy to communicate is an inefficient ("chatty") format based on the exchange of data through Extensible Markup Language ("XML") documents (e.g., using the Simple Object Access Protocol ("SOAP"))

One exemplary Web Service is that provided by a social networking site. A "social network" is a map of the relationships between individuals, indicating the ways in which they are connected through various social familiarities ranging from casual acquaintance to close familial bonds. Social networking is the practice of expanding and/or maintaining those relationships within the map. For example, in business, businessmen will refer friends to other businessmen (e.g., exchanging business cards). In casual life, persons will attend parties of a friend in order to connect and build relationships with the friend's friends.

Within the last ten years, social networking through the Internet has become popular. A variety of services are provided by social networking sites which allow users to communicate and exchange information including, for example, Instant Messaging, E-Mail messaging, Message Boards, photo sharing services, etc. Recently, social networking sites such as MySpace®, LinkedIn®, and Yahoo! ® ( Local have become a popular choice for social networking. To improve social networking, MySpace® includes, for example, personal Web pages for each user including profiles, blogs, pictures, videos, a "shoutbox," instant messaging, a list of "friends" (other users on the MySpace® network that allow each other communications between the two users), e-mail capabilities, bulletin boards, and calendars. To use the social networking services, a user logs into the service's website (e.g., MySpace.com) from his or her personal computer. Mobile devices currently provide access to social networking sites through a Web browser or WAP application.

SUMMARY

Various embodiments are described for interfacing a wireless device with a plurality of web services including social networking web services. For example, a system according to one embodiment comprises a system for interfacing a wireless device with a plurality of web services comprising a web service proxy having an API to allow other modules to interface with the web service integration proxy; a plurality of web services adapters interfaced with the web services proxy through the API, each one of the web services adapters configured to communicate with a particular web service using the specific communication formats required by that web service; the wireless communication format being a different format than the communication formats required by each of the web services; wherein the web services adapters and the web services proxy convert between the communication formats employed to communicate with each of the web services and the wireless communication format, thereby enabling bi-directional communication between the wireless device and the plurality of web services.

BRIEF DESCRIPTION OF THE DRAWINGS

A better understanding of managing web services data and presence data can be obtained from the following detailed description in conjunction with the following drawings, in which.

DETAILED DESCRIPTION OF PREFERRED EMBODIMENTS

Throughout the description, for the purposes of explanation, numerous specific details are set forth in order to provide a thorough understanding of managing web services data and presence data. It will be apparent, however, to one skilled in the art that the techniques may be practiced without some of these specific details. In other instances, well-known structures and devices are shown in block diagram form to avoid obscuring the underlying principles of managing web services data and presence data.

Embodiments of a Data Processing Service

Figure 1:
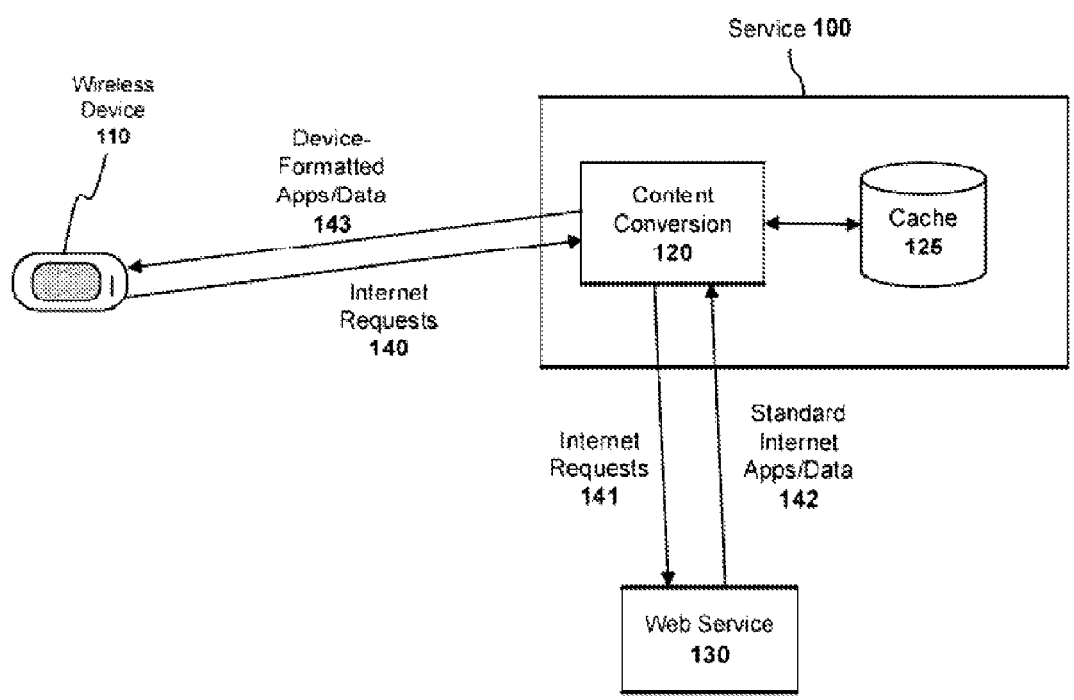
FIG. 1 illustrates a service communicating with a data processing device according to one embodiment of the invention.

Embodiments of managing web services data and presence data may be implemented on a wireless device 110 which communicates with a data processing service 100 as illustrated generally in FIG. 1. Embodiments of a service 100 and data processing device 110 are described, for example, in co-pending application entitled SYSTEM AND METHOD FOR INTEGRATING PERSONAL INFORMATION MANAGEMENT AND MESSAGING APPLICATIONS, Ser. No. 10/262,298, filed Sep. 30, 2002, and embodiments of dynamically managing presence and contact information on a data processing device 110 are described in co-pending application entitled SYSTEM AND METHOD FOR DYNAMICALLY MANAGING PRESENCE AND CONTACT INFORMATION, Ser. No. 10/611019, filed Jun 30, 2003 (hereinafter "co-pending applications"), which are assigned to the assignee of the present application and which are incorporated herein by reference.

Certain features of the service 100 will now be described followed by a detailed description of the system and method for connecting a wireless communication device 110 to a Web Service. It should be noted, however, that the specific data processing device and system architecture described in the co-pending applications are not required for implementing the underlying principles of the invention.

In one embodiment, the service 100 converts standard applications and data into a format which each data processing device 110 can properly interpret. Thus, as illustrated in FIG. 1, one embodiment of the service 100 includes content conversion logic 120 for processing requests for Internet content 140 from a wireless device 110. More particularly, the service 100 acts as a proxy for the data processing device 110, forwarding Internet requests 140, 141 to the appropriate Web server and/or Web Service 130 (hereinafter referred to as "Web service") on behalf of the data processing device 110, receiving responses from the Web Service 130 in a standard Web services format (e.g., data employing a particular Web services schema and formatted according to the SOAP protocol or the Wireless Application Protocol (WAP)), and converting the responses 142 into a format which the data processing device 110 can process (e.g., bytecodes as described in the co-pending applications).

For example, the conversion logic 120 may include a rendering module (not shown) for interpreting the Web services code or HTML code and translating that code into a format capable of being processed/rendered on the data processing device 110. As described in the prior applications, in one embodiment, the device-specific format comprises bytecodes/applets which, in one embodiment, are a form of Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested data accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

Communicating with a Web Service

Figure 2:
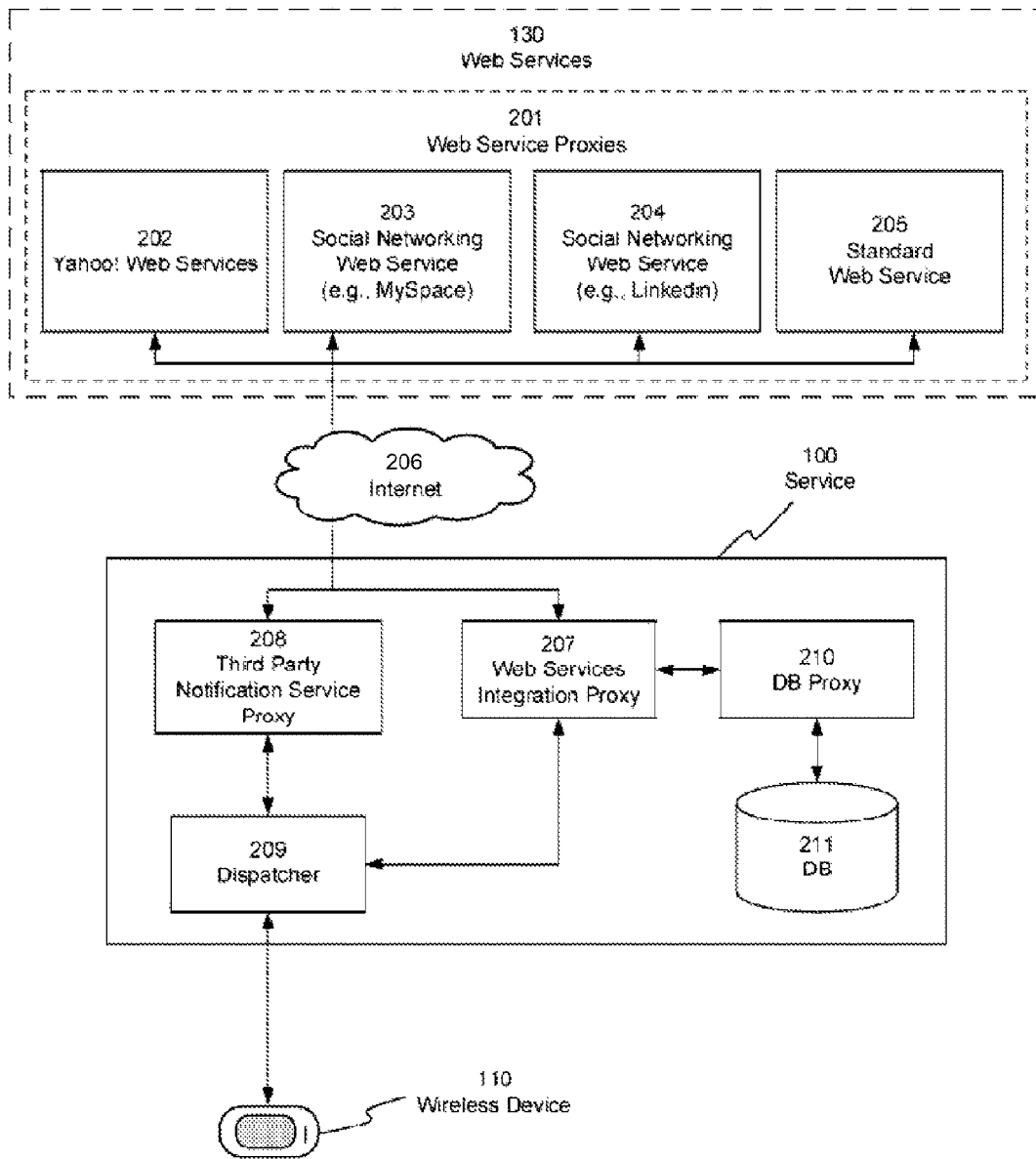
FIG. 2 illustrates one embodiment of a service for connecting a wireless device to a Web Service.

FIG. 2 illustrates one embodiment of the service 100 used to connect a wireless communication device 110 to Web services proxies 201 of various different Web services 130 (e.g., Yahoo! ® ( Web Service 202, various different social networking Web services proxies 203-204, and one or more standard Web Services proxies 205). Although the following description will focus on an implementation for connecting a wireless communication device 110 to a social networking Web Service 203-204 (e.g., a MySpace® Web Service or a LinkedIn® Web Service), the underlying principles of the invention are not limited to a social networking implementation. For example, certain embodiments of the invention may connect the wireless communication device 110 to other types of Web services (e.g., Yahoo! ® ( Web Services 202, EBay® Web Services, etc). In addition, while only two social networking Web Service proxies 203-204 are illustrated in the figures and described below, the embodiments of the invention described herein may connect to a virtually unlimited number of other social networking Web Services (or, for that matter, any type of Web services). Therefore, the scope of the invention should not be limited to the examples provided below.

When a user attempts to connect to or communicate with a Web Service 201 (e.g., EBay® or MySpace®) through the wireless communication device 110, the service 100 communicates directly with the Web Service 201 on behalf of the user of the wireless device 110 through the Internet 206 (e.g., using the Web Services protocols/schema required for that particular Web services proxy 202-204). In order to facilitate communication between the Web Service 201 and the wireless communication device 110, one embodiment of the service 100 includes a Web Service integration proxy 207, a notification service proxy 208, a dispatcher 209 to communicate with the wireless communication device 110, a database (DB) proxy 210, and a DB 211.

The notification service proxy 208 receives push notifications from all Web Services 130 for each user logged into via the plurality of Web Services proxies 201 and distributes those notifications to the wireless device 110. Exemplary push notifications from a Web Service 130 include an instant message or a notification that an e-mail has been received within the user's social networking account, or that some other update to the Web service has occurred (e.g., a post from a friend on MySpace®). Thus, the notification service proxy 208 represents a single point of management for all push communications from a Web Service 130 to all wireless communication devices 110 connected to the service 100. Consequently, even though wireless communication devices may be disconnected from the service (e.g., due to loss of network coverage), the push notification may still be sent to the service 100, which stores the notification on behalf of the user. The dispatcher 209 then forwards the push notification to the correct wireless communication device 110 once the wireless communication device 110 is reconnected to the service 100.

In one embodiment of the invention, the Web Service integration proxy ("WSIP") 207 handles communications other than the push notifications to/from the Web Services 130. For example, when a user on a wireless communication device 110 requests an update to the user's profile on a social networking Web Service 130, this process is handled by the WSIP 207. Similarly, when a user logs in and requests updates from one of the Web Services 130, this process is managed by the WSIP 207.

Figure 3:
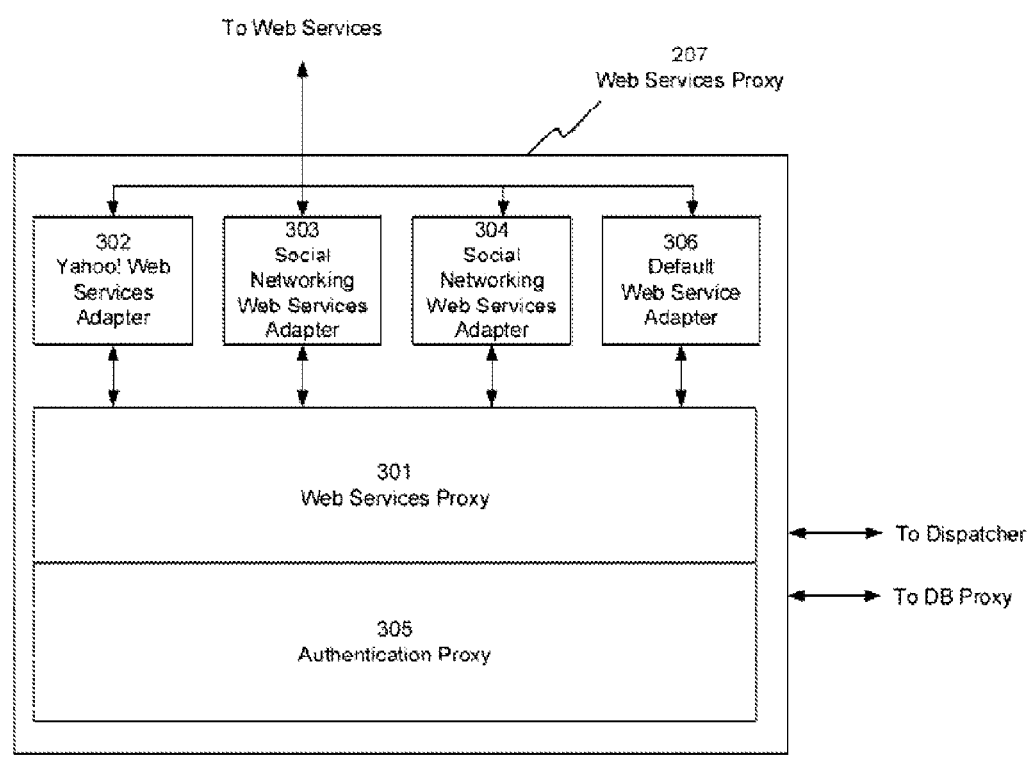
FIG. 3 illustrates one embodiment of the Web Service integration proxy illustrated in FIG. 2.

FIG. 3 illustrates one embodiment of the Web Service integration proxy 207 employed within the service 100. In the illustrated embodiment, the Web Service integration proxy 207 includes a "local" Web Services proxy 301 (i.e., "local" in this sense that it runs on the service 100), a plurality of Web Services adapters 302-304 communicably connected to the Web Services proxy 301, and an authentication proxy 305.

In contrast to prior systems in which a WAP application on a wireless communication device 110 interfaces directly with the various Web Services proxies 201, in this embodiment of the invention, the local Web Services proxy 301 interfaces with the Web Services proxies 201 on behalf of the wireless communication device 110 using the Web Services adapters 302-304.

As mentioned above, certain Web Services exchange information with clients and servers on the Internet using various protocols and encodings, for example the Simple Object Access Protocol (SOAP). SOAP is a message-based protocol which employs an XML syntax to send text commands across the Internet using the Hypertext Transport Protocol (HTTP). Other Web Services protocols such as XML/RPC and REST ("Representational State Transfer") may also be used consistent with the underlying principles of the invention.

Although most Web Services use these standard protocols, many Web Services employs their own specific format (e.g., data schema and rules for communication) which must be followed in order to communicate with those Web services. In addition, each Web service employs its own unique API, i.e., the set of functions and interfaces exposed by the Web service. Thus, in one embodiment of the invention, a separate Web Services adapter 302-304 is used to communicate with each of the Web Services proxies 202-204, respectively, using the formats require by those proxies. In addition, as illustrated in FIG. 3, one embodiment of the invention includes a "global" or "default" Web Services adapter 306 for communicating with web services using standardized (i.e., non-proprietary) Web Services communication formats.

The Web Services adapters 302-304 are "plugged in" to the Web Services Proxy 301 through an API exposed by the Web Services Proxy 301. Each of the Web Services adapters 302 exchange data and program code with the Web Services Proxy Web Services proxy via this API.

In operation, when data from a particular Web Service, e.g., social networking Web Service 204, is requested on behalf of a wireless device 110, the adapter. 304 associated with that Web Service 204 communicates with the Web Service 204 using the required data schema and other communication standards required by the Web Service 204. The adapter 304 provides the requested data to the Web Services proxy 301 via the Web Services proxy API. In one embodiment, the adapter 304 may also convert the data into a format interpretable by the Web Services proxy 301. The Web Services proxy 301 extracts the underlying data and encapsulates the data into the communication format required for communicating to the wireless device 110. If the wireless device is currently online, then the dispatcher 209 to which the wireless device 110 is currently connected transmits the data to the wireless device 110 using an asynchronous protocol specifically adapted for transmission over high-latency networks (e.g., wireless networks). For upstream communication, when the user of the wireless device 110 transmits information to the social networking Web Service 204 (or other Web Service), the information is transmitted through the dispatcher using the same protocol. The Web Services proxy 301 extracts the information and communicates the information to the appropriate Web Services adapter 304 via the Web Service proxy API. The Web Services adapter 304 then communicates the new information to its associated Web Service 204 using the required data schema and other communication standards required by the Web Service 204.

One notable benefit of this architecture is that if a particular Web Services proxy (such as social networking web services proxy 204) modifies its communication standards/protocol, then only the specific adapter for that web services proxy (e.g., social networking web services adapter 304) needs to be modified or replaced. The remaining software executed on the service 100 (e.g., the Web Services Proxy 301) and each of the wireless devices 110 does not need to be changed. Thus, the network bandwidth, as well as the engineering time which would normally be required to upgrade each individual wireless device 110 is conserved.

As mentioned above, the wireless communication device 110 communicates with the dispatcher 209 (which is described in detail in the prior applications) using an asynchronous, message-based protocol specifically tailored for a high-latency network (such as a wireless network). Specifically, in one embodiment (described below with respect to FIG. 6), the Web Services proxy 301 combines multiple request/response interactions with each of the Web Services 202-204 into a single communication to the wireless device 110, thereby conserving network bandwidth. In addition, as previously described, because the service 100 understands the data formats which wireless communication device 110 is capable of interpreting (e.g., video display resolution, processor speed, memory capability, etc.), the service 100 converts the underlying data into these specific data formats, typically compressing the data to conserve additional bandwidth. Hence, communications directed to/from a Web Service 130 from/to a wireless communication device 110 is in a more compressed, more efficient format when transmitted between the service 100 and the wireless communication device 110 than the typical formats produced by a WAP application.

Although the embodiments described above employ the SOAP protocol to communicate with Web Services, the underlying principles of the invention are not limited to any particular protocol. Virtually any other protocol may be employed consistent with the underlying principles of the invention (e.g., DCOM, CORBA or any RMI/RPC interface as defined by the World Wide Web Consortium.

Figure 6:
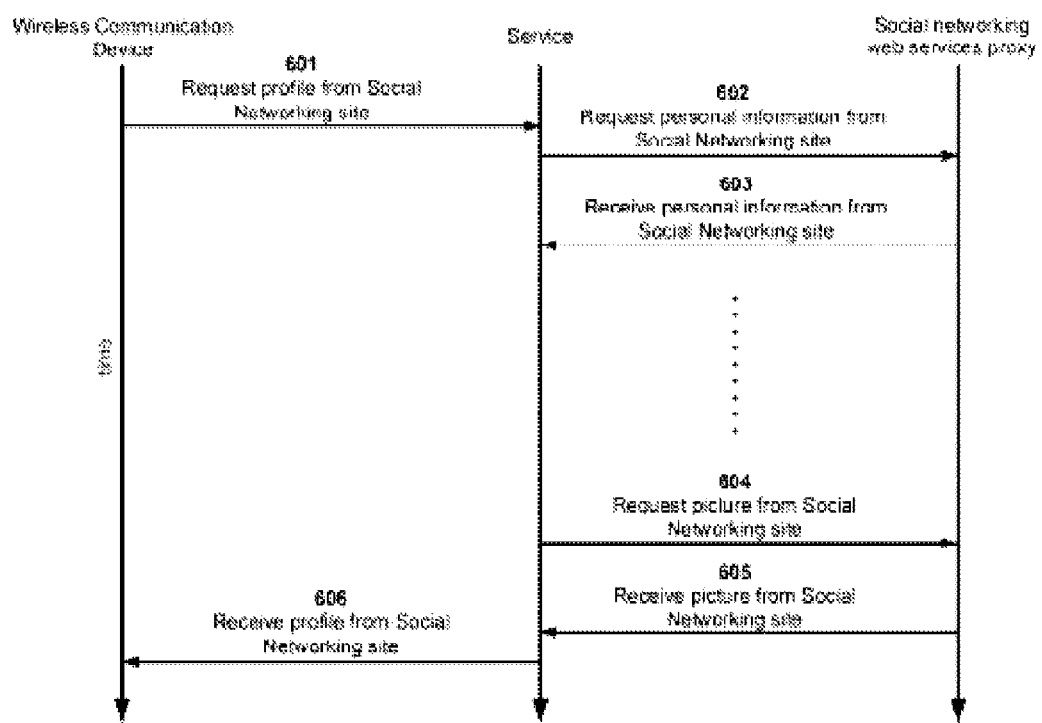
FIG. 6 illustrates an example collapsing of the number of requests required from a wireless communication device illustrated in FIG. 1 in pulling information from a Web server.

As previously described, the wireless communication device 110 may communicate a request for specific information, such as social networking information, from a Web Service 130 via the service 100. In one embodiment of the invention, the service 100 collapses the number of request/response interactions with the Web service 130 in order to fulfill the user's request. One specific example is illustrated in FIG. 6, where the user wishes to access the user's social networking profile from a social networking site and multiple requests are required to the social networking Web Service 204 for different objects (e.g., one request to retrieve the user's picture and another request to retrieve the user's personal information). The wireless communication device 110 sends one general request 601 to the service 100 to simply obtain the profile. The Web Services proxy 301 receives the request from the wireless communication device 110 and converts the single request into the multiple requests required to pull the requested information (e.g., picture and personal information) from the social networking Web Service 204. As mentioned above, the request/response interactions are managed by the adapter 304 associated by the specific Web Service 204. Thus, the adapter 304 forwards the request for the personal information 602 to the social networking Web Service 204. The social networking Web Service 204 responds with the personal information to the adapter 204 (603). The adapter 304 then forwards the next request 604 (e.g., for an image) to the Web service 204. The social networking Web Service 304 responds with the image to the adapter 204 (605). Once the service 100 receives all of the information to fulfill the wireless communication device's 110 request 601, the Web Services proxy 301 combines all of the requested information to the wireless communication device 110 in one response (606). As illustrated in FIG. 6, more than two requests and responses to/from a Web Service 201 by the service 100 may exist for each request and response to/from the service 100 by the wireless communication device 110. Hence, for different requests communicated from the wireless communication device 110 to the service 100, any number of requests from the service 100 to a Web Service 130 may be included in the different requests between the device 110 and the service 100.

In order to access information from different Web Services 130, a user may need to be logged into the Web Services 130. Hence, the service 100 may log a user of the wireless communication device 110 into the required Web Services 130. Referring to FIG. 3, in one embodiment, the authentication proxy 305 transparently collects login information (e.g., username and password) for a user in order to connect to a Web Service 130. In one embodiment, the DB 211 (FIG. 2) stores a user's login information for multiple Web Services 130. When the authentication proxy 305 (FIG. 3) needs to collect a user's login information for a specific Web Service 130 (e.g., MySpace®), the authentication proxy 305 requests the information from the DB proxy 210 (FIG. 2). The DB proxy 210 then accesses the DB 211 for the login information and forwards the login information to the authentication proxy 305. The Web Services proxy 301 then communicates the login information to any or all of the Web Services 130. In one embodiment, after retrieving authentication credentials from the wireless device, the service 100 (via the authentication proxy 305 and Web services proxy 301) automatically logs the user of the wireless communication device 110 onto multiple Web Services 130 without requiring additional input from the user (assuming that the proper authentication information for each Web service is available from the user database via the DB proxy 210). As a result, a user may access information from various Web Services 130 without manually entering the required login information for each individual Web Service 130. Furthermore, the service 100 may keep a user logged in for an extended period of time, even if the wireless communication device 110 temporarily disconnects from the service 100.

Figure 4:
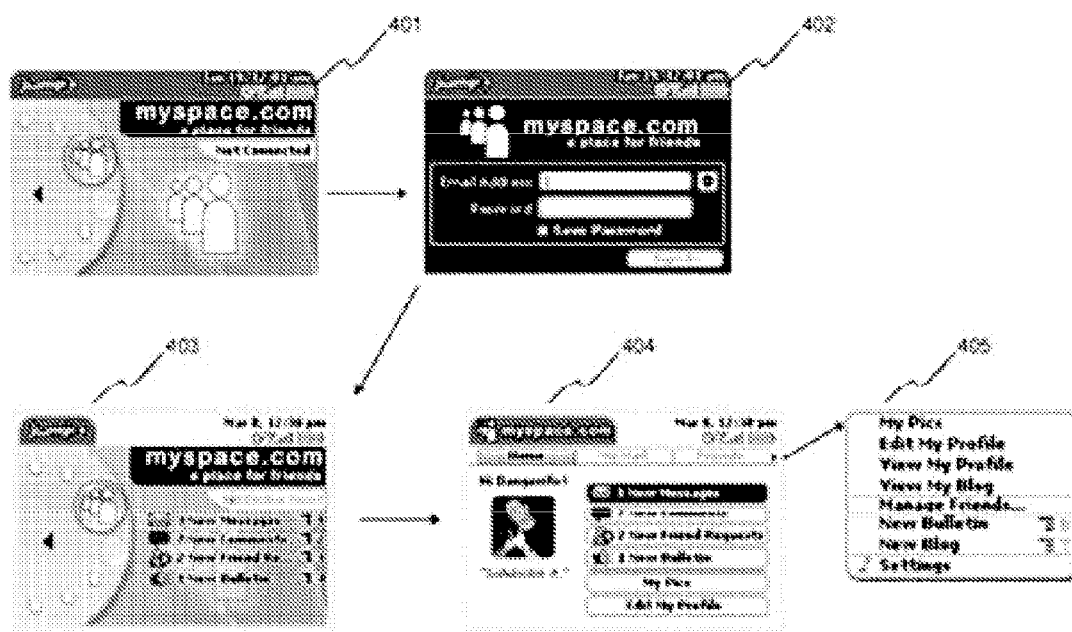
FIG. 4 illustrates screen captures of a specific example of a user interface for communicating with MySpace®, a social networking site, as a Web Service.
Figure 5A:
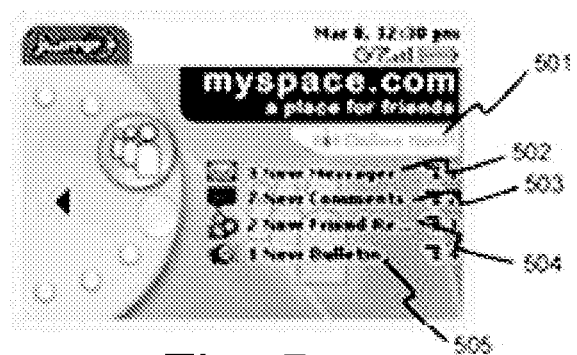
FIGS. 5a-c illustrates screen captures from the user interface in FIG. 4 of a wireless communication device illustrated in FIG. 1 while the device is persistently logged in to the MySpace® social networking site.

FIG. 4 illustrates one embodiment of the user interface screen captures of the wireless communication device 110 for logging into and interfacing MySpace®, which is a specific social networking site (i.e., a specific Web Service 201). The capture 401 shows that an identifier exists on a menu of the wireless communication device 110. When a user wishes to access the social networking service, the user highlights and selects the social networking service identifier. Highlighting the identifier may show whether the user is logged in to the social networking service. Upon selecting the identifier, the user may be requested for his login information. As previously described, the service 100 may instead automatically login the user into the social networking Web Service 130. Once the user is logged into the social networking Web Service, the service 100 pulls information for the user and transmits the information to the wireless communication device 110 to be displayed for the user as in 403. FIG. 5a illustrates that the information may include that the user is logged in 501, number of new messages 502, number of new comments 503, number of new friends reminders 504, and number of new bulletins 505. Captures 404 and 405 illustrate example screen captures of windows or menus for accessing the new information (e.g., unread messages) from the social networking service alerted in 403.

Figure 5B:
Figure 5C:

While a user is logged into the social networking service, the user is able to use the wireless communication device for activities other than accessing the social networking service (e.g., making a phone call, listening to MP3's). Thus, because the user is logged in, the user stills receives notifications of when new information is received at the social networking service. For example, FIG. 5b illustrates a visual notification 506 when the user receives a new message from another user. In addition, as illustrated in FIG. 5c, the user interface includes displaying an identifier 507 (e.g., in a menu bar) for when a user is logged into the social networking service. Notifications to the user may be visual (506) and/or audio/vibrations. The notifications may be received through push notifications from the social networking Web Service 204 or by the service 100 periodically checking the social networking Web Service for any updates.

While the screen captures are for a specific embodiment for interfacing a specific Web Service 130 (i.e., MySpace®), user interfaces are not limited to interfacing social networking sites. A similar portion of the user interface may exist for each Web Service that the service 100 is able to contact and with which Web Service 130 the user wishes to communicate.

For any requests or communications between the wireless communication device 110 and the Web Service 130 that the WSIP 207 or the Push Notification Proxy 208 cannot handle, the wireless communication device 110 may communicate with an Internet site of the Web Service 130 via the service 100 using a standard Web browser on the wireless communication device 110.

Although specific examples of social networking data were provided above (e.g., images, email messages, etc), the underlying principles of the invention are not limited to any particular type of social networking data. Social networking information processed by the service 100 may include, but is not limited to, user profiles, blogs, pictures, videos, a "shoutbox," instant messages, a list of "friends", e-mail messages, bulletin boards, and calendars, to name a few.

Unified Social Networking Data and Presence Management

Figure 7:
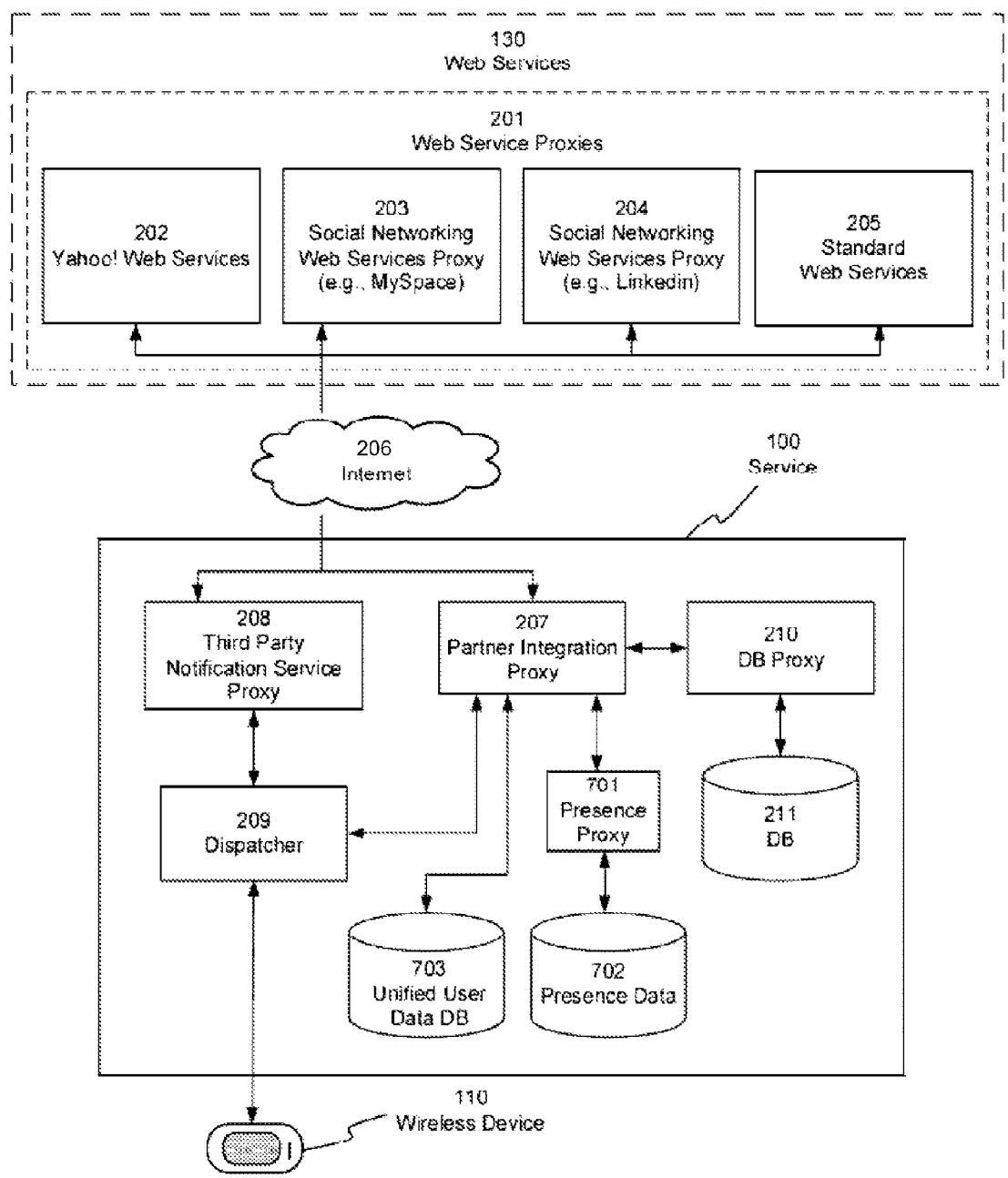
FIG. 7 illustrates one embodiment of a service illustrated in FIG. 2 including a location server for presence information of wireless communication devices.

One embodiment of the invention integrates user data from multiple social networking sites to generate a unified view of the social networking data for each user. This is possible because (as described above), the authentication proxy 305 of the WSIP 207 has access to user authentication data for multiple social networking sites (via the DB proxy) and is therefore capable of concurrently connecting the user to each of the social networking sites. As illustrated in FIG. 7, in one embodiment, the WSIP 207 extracts the social networking data from the various sites and stores the combined social networking data in a standardized format within a unified social networking database 703. Although a separate database 703 is shown in FIG. 7 for the purpose of illustration, a separate database is not required for complying with the underlying principles of the invention. Once collected, the unified data is then made accessible to other users linked through the various social networks. The unified data may also be used for a variety of other applications (e.g., address book applications, calendar applications, email applications, etc).

In addition, one embodiment of the service 100 manages "presence" information for users of the service 100 and integrates the presence information with the social networking user information gathered from various social networking sites. As illustrated in FIG. 7, each user's presence information is collected and maintained within a presence database 702 accessible through a presence proxy 701.

As used herein, a user's "presence" may include both the physical location of a user and the electronic state (e.g., availability) of the user, and various combinations thereof. For example, one embodiment of the invention tracks the physical/geographical location of each user, potentially at different levels of granularity (as described in the co-pending applications). By way of example, and not limitation, presence data related to the user's location may include the state or city in which the user is currently located, the relative distance between the user and another user, or the exact physical location of the user (e.g., longitude and latitude or using a particular street address or intersection). The granularity provided to other users by the service 100 may be defined based on the capabilities of the service 100 and data processing device 110 to identify the location of the user and/or based on the user's preferences as to the granularity that should be provided to other users (e.g., a user may only want certain users to have access to the most precise level of granularity (e.g., street address versus city). This may be accomplished through various types of user interfaces (e.g., an option box selectable by the user to prevent the service 100 from broadcasting the wireless communication device's 110 presence information to other wireless communication devices 110). The electronic "presence" of the user includes information related to whether the user is currently online (e.g., logged in to a social networking service or an instant messaging session).

The presence data and social networking data may be combined in various beneficial ways. For example, according to one embodiment, a user is provided with the ability to search for other users matching user-specific criteria (e.g., with specific interests) who are geographically near that user and/or who are electronically present (e.g., logged in to the social network).

As mentioned above, to implement the foregoing concepts, the service 100 of FIG. 7 includes a searchable presence database for storing the each users geographical or electronic presence.

The location of a wireless communication device 110 may be determined in a variety of ways. For example, it may be determined through the use of an integrated or attached Global Positioning System (GPS) integrated within wireless communication device 110. Alternatively, or in addition, the location of a wireless communication device 110 is determined by known method of triangulating between multiple cellular towers of which the wireless communication device 110 is in range. Furthermore, a general location may be determined by identifying the cellular tower to which the wireless communication device 110 is connected.

Figure 8:
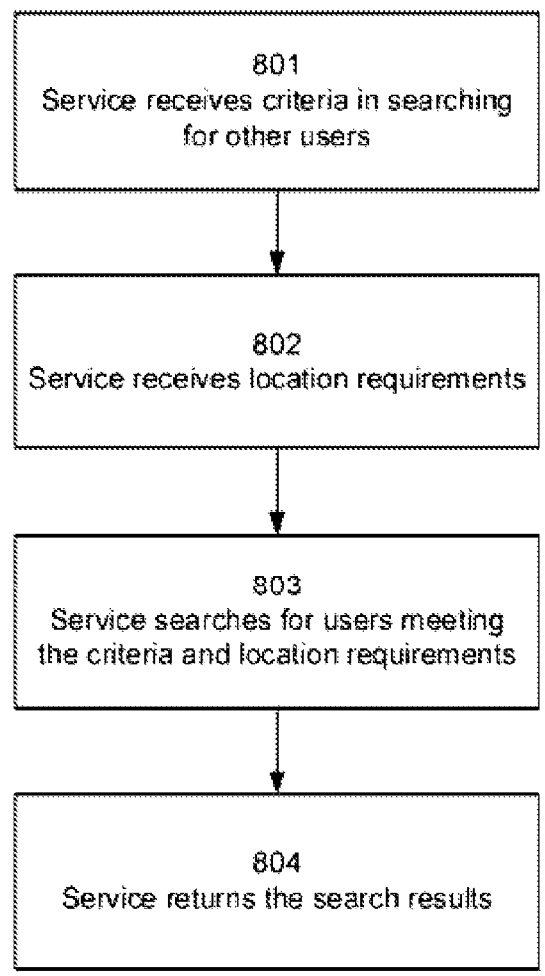
FIG. 8 illustrates an example of a service 100 determining the location of users with similar interests for a user of the wireless communication device 110.

FIG. 8 illustrates one embodiment of a method implemented by the service 100 to determine the location of other users fitting specified criteria. Beginning in 801, the service 100 receives a request to search for users with specified criteria. Example criteria include hobbies (e.g., skateboarding, chess, tattooing), memberships (e.g., member of Phi Sigma Epsilon), schools attended (e.g., alumnus of University of Charlotte), etc. The criteria may further include the reasons why a user is in a specific location (e.g., a user of a particular gender looking to meet another user of a particular gender, an indication that a user is at a party or at work, an indication that a user is attending a fundraiser, etc). A virtually unlimited number of criteria may be specified consistent with the underlying principles of the invention.

In one embodiment of the present invention, the service 100 attempts to automatically determine the reason a user is in a specific location. For example, the service 100 may determine that a user is at work because the wireless communication device 110 of the user is on a specific cellular tower to which the device 110 connects during work hours (e.g., 8 am to 6 pm Monday-Friday). The user may also rank the importance of criteria in order to rank the relevance of imperfect matches.

Returning to FIG. 8, once the service 100 receives the user criteria, the service 100 receives the location requirements from the wireless communication device 110 at step 802. For example, the user may choose to search for other users within a two mile radius of the user. The user may also select a specific location where the user is not present (e.g., San Francisco, Calif. when the user is in San Jose, Calif.).

Once the service 100 receives the location requirements, the service 100 searches for users meeting the criteria and the location requirements in 803. In searching for persons meeting specified criteria, the WSIP 207 of the service 100 communicates with Web Services 130 as described herein. For example, the WSIP 207 communicates with a social networking Web service 204 in order for the service 100 to search for users meeting the criteria. Since the service 100 is able to transparently log a user into multiple websites by storing login information, the service 100 may search multiple Web Services (e.g., Yahoo! ® Local, LinkedIn®, and MySpace®)

for users meeting the specified criteria and/or may search the unified user data DB 703 to search for users meeting the criteria.

In one embodiment, the service 100 allows the user to limit the pool of users for the search to users of wireless communication devices 110 currently connected to the service 100, or otherwise logged into a social networking service or other service (e.g., an instant messaging service). Alternatively, or in addition, the service 100 may allow the user to limit the pool of users to search to the other users in the user's address book (e.g., a MySpace® address book or a unified address book maintained on the service 100).

Once the WSIP 207 of the service 100 receives the list of users that match the criteria and/or the ranking of how well the users match the criteria (how close to a perfect match), the WSIP 207 searches the presence database 702 to determine the locations of the users (and thus determine which users match the both the criteria and the specified location requirements). The list may be prioritized based on, for example, the location or the rankings of matching criteria. The service 100 then returns the search results to the requesting user on the wireless communication device 110 at step 804.

After the wireless communication device 110 receives the results, the wireless communication device 110 displays the results to the user. The results may be displayed in a variety of formats including a simple list, or as icons on a map so as to show the specific location of each of the resultant users. The map data may be stored on the wireless communication device (e.g., NavTech®) and/or may be accessed from a public site, such as Google® Maps or Mapquest®. The icons may include the priority ranking of the corresponding user (e.g., as defined by how close the users match the criteria and presence specifications).

In one embodiment of the present invention, if a wireless communication device 110 of another user that matches the user's criteria comes in proximity with the wireless communication device 110 of the searching user, the searching user is alerted to the close proximity of a user meeting the criteria. The other user matching the criteria may also be alerted as the proximity of the user searching for them. The wireless communication device 110 then provides the user performing the search the option of contacting the other user and/or may automatically attempt to connect the two users through a communication channel (e.g., telephone call, Instant Messaging (IM), Email, SMS, etc.). Since the service 100 provides users with the ability to hide their location information, the users may also be given the option not to be contacted by users via the presence-based techniques described herein.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, aspects of the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, multi-purpose telephony/data processing devices are particularly suitable for implementing certain aspects of the invention because these devices can initiate communication over a variety of communication channels (e.g., voice, IM, email, SMS, MMS, . . . etc). However, the underlying principles are not limited to these types of devices. For example, the underlying principles of the invention may be implemented within standard personal computer configurations standard wireless telephones, and/or other types of communication devices (e.g., vehicle communication devices). Moreover, although the invention was described in the context of specific types of messaging applications (e.g., email, instant messaging, . . . etc), the underlying principles of the invention are not limited to any particular type of messaging application.

In fact, while the various proxies were described as using SOAP, XML, and/or REST, any communication protocol or means of communicating between two nodes may be employed. Additionally, while the service 100 is described as receiving criteria and presence requirements, many requirements may include a default so as to not be necessary. Furthermore, the service 100 may first search for users without receiving location requirement in order to determine whether any users match the criteria, or vice versa. Requests sent to the service 100 from the wireless communication device 110 may also be in a single communication or multiple communications. In addition, references to a Web Service 201 or server or social networking site are not limited to the examples given (e.g, EBay®, Yahoo! ® (Local, LinkedIn®, MySpace®).

Accordingly, the scope and spirit of the invention should be judged in terms of the claims which follow.

What is claimed is:

1. A method comprising:
   collecting social networking data for multiple users from multiple social networking sites;
   combining the social networking data for the multiple users to generate a unified compilation of the social networking data;
   collecting presence data related to a geographic location or an electronic presence of the multiple users;
   receiving a request for a list of the multiple users matching a specified criteria related to the social networking data and the presence data;
   searching the unified compilation of the social networking data and the presence data in accordance with the request to generate the list of the multiple users matching the specified criteria; and
   transmitting the list of the multiple users matching the specified criteria.

2. The method as in claim 1 wherein the electronic presence comprises an indication as to whether one or more of the multiple users is online.

3. The method as in claim 1 wherein the presence data is collected in the form of global positioning data related to a specific location of one or more of the multiple users.

4. The method as in claim 1 wherein the presence data is collected in the form of a city and/or state in which one or more of the multiple users is currently located.

5. The method as in claim 1 wherein the presence data is collected in the form of a street address, intersection or business name.

6. One or more computer-readable storage media having instructions stored thereon that, when executed by a processor, perform a method comprising:
- collecting social networking data for multiple users from multiple social networking sites;
- combining the social networking data for the multiple users to generate a unified compilation of the social networking data;
- collecting presence data related to a geographic location or an electronic presence of the multiple users;
- receiving a request for a list of the multiple users matching a specified criteria related to the social networking data and the presence data;
- searching the unified compilation of the social networking data and the presence data in accordance with the request to generate the list of the multiple users matching the specified criteria; and
- transmitting the list of the multiple users matching the specified criteria.

7. The one or more computer-readable storage media as in claim 6, wherein the electronic presence comprises an indication as to whether one or more of the multiple users is online.

8. The one or more computer-readable storage media as in claim 6, wherein the presence data is collected in the form of global positioning data related to a specific location of one or more of the multiple users.

9. The one or more computer-readable storage media as in claim 6, wherein the presence data is collected in the form of a city and/or state in which one or more of the multiple users is currently located.

10. The one or more computer-readable storage media as in claim 6, wherein the presence data is collected in the form of a street address, intersection or business name.

11. A wireless communication device comprising:
a processor; and
one or more computer-readable storage media having instructions stored thereon that, when executed by the processor, perform a method comprising:
- collecting social networking data for multiple users from multiple social networking sites;
- combining the social networking data for the multiple users to generate a unified compilation of the social networking data;
- collecting presence data related to a geographic location or an electronic presence of the multiple users;
- receiving a request for a list of the multiple users matching a specified criteria related to the social networking data and the presence data;
- searching the unified compilation of the social networking data and the presence data in accordance with the request to generate the list of the multiple users matching the specified criteria; and
- transmitting the list of the multiple users matching the specified criteria.

12. The wireless communication device as in claim 11, wherein the electronic presence comprises an indication as to whether one or more of the multiple users is online.

13. The wireless communication device as in claim 11, wherein the presence data is collected in the form of global positioning data related to a specific location of one or more of the multiple users.

14. The wireless communication device as in claim 11, wherein the presence data is collected in the form of a city and/or state in which one or more of the multiple users is currently located.

15. The wireless communication device as in claim 11, wherein the presence data is collected in the form of a street address, intersection or business name.

\* \* \* \* \*